United States Patent
Chang et al.

(10) Patent No.: US 6,250,810 B1
(45) Date of Patent: Jun. 26, 2001

(54) CONSTRUCTION OF PILLOW

(75) Inventors: Shon-Chen Chang; Wen-Shi Huang, both of Taoyan Shien (TW)

(73) Assignee: Delta Electronics, Inc., Taoyan Shien (TW)

( * ) Notice: Subject to any disclaimer, the term of this patent is extended or adjusted under 35 U.S.C. 154(b) by 0 days.

(21) Appl. No.: 09/375,423

(22) Filed: Aug. 17, 1999

(30) Foreign Application Priority Data

May 6, 1999 (TW) .................................................. 88207244

(51) Int. Cl.[7] ........................................................ F16C 17/02
(52) U.S. Cl. ............................ 384/428; 384/537; 384/584
(58) Field of Search ....................................... 384/206, 207, 384/208, 213, 428, 437, 584

(56) References Cited

U.S. PATENT DOCUMENTS 5,735,668 * 4/1998 Klein .................................... 384/124

* cited by examiner

Primary Examiner—Lenard A. Footland
(74) Attorney, Agent, or Firm—Bacon & Thomas, PLLC

(57) ABSTRACT

A pillow for holding a bearing comprises an outer circumferential sidewall having a radially inner side and an inner circumferential sidewall for holding the bearing. The inner circumferential sidewall has a first end connected with the radially inner side of the outer circumferential sidewall and a second end opposite to the first end. The outer circumferential sidewall and the inner circumferential sidewall are spaced apart except at the first end.

10 Claims, 3 Drawing Sheets

CONSTRUCTION OF PILLOW

BACKGROUND OF THE INVENTION

1. Field of the Invention

The present invention relates generally to a motor structure, and more particularly, to a pillow having vibration-absorbing means and heat insulating means of a motor structure.

2. Description of the Related Art

In rotation, the temperature of the stator of a common motor rises and its heat is transferred to its surroundings. The heat transferred to the bearing adversely affects its life. In a common fan motor, e.g. a fan motor disclosed in U.S. Pat. No. 5,343,104, a pillow is provided between a bearing and the stator of the motor. The heat generated in the stator of the motor transfers to the bearing through the pillow. A conventional fan motor similar to the fan motor disclosed in U.S. Pat. No. 5,343,104 will be described in the following.

FIG. 1 shows a conventional fan motor structure. It comprises an upper casing 101; a lower casing 102 having a base portion 102a and a pillow portion 102b; a bearing 103 accommodated in the pillow portion 102b; a rotation shaft 104 supported by the bearing 103; a C-ring 105 snap engaged with the rotation shaft 104 for fixing the bearing 103 at an axial location; an impeller 106; a coil unit 107, and a printed circuit board 108. The impeller 106 consists of a plurality of blades 106a, a yoke 106b, a ring-shaped magnet 106c, and a hub portion 106d. The coil unit 107 consists of an upper cover 107a, a lower cover 107b, and a stator core 107c.

When the impeller rotates, the heat generated in the coil unit 107 transfers to the bearing 103 through the pillow portion 102b and causes an adverse effect. Generally speaking, the pillow portion 102b can be made of plastic or copper.

Although the pillow portion 102b made of plastic can achieve a certain degree of insulation, most of the heat rapidly transfers to the bearing 103 through the thin sidewall of the pillow portion 102b. The pillow portion 102b made of copper can rapidly transfers heat to the bearing 103 because it can achieve a good heat conduction effect. Therefore, the pillow portion 102b cannot insulate the bearing 103 from the heat generated in the coil unit 107 to avoid the adverse effect on the bearing 103.

Moreover, when the fan motor operates, the vibration of the impeller 106 transmits to the bearing 103 through the rotation shaft 104 and then transmits to the coil unit 107 and the printed circuit board 108 through the pillow portion 102b. The slight transmission of the vibration can result in the vibration and noises of the system in which the fan motor is mounted and serious transmission of the vibration can result in the disengagement between the coil unit 107 and the printed circuit board 108 or even the disengagement of the electronic elements (not shown) from the printed circuit board 108. Therefore, if the vibration can be absorbed more effectively then the life of all the elements of the fan motor can be prolonged.

SUMMARY OF THE INVENTION

It is therefore an object of the present invention to provide a pillow having vibration absorbing and heat insulating features. More specifically, the pillow can absorb the vibration generated when the motor operates and can prevent the heat generated in the motor from transmitting to the bearing in the motor.

In accordance with the first aspect of the invention, a pillow for holding a bearing comprises an outer circumferential sidewall having a radially inner side; an inner circumferential sidewall for holding the bearing, the inner circumferential sidewall having a first end connected with the radially inner side of the outer circumferential sidewall and a second end opposite to the first end, and the outer circumferential sidewall and the inner circumferential sidewall being spaced apart except at the first end.

The outer circumferential sidewall and the inner circumferential sidewall are integrally formed.

The pillow further comprises an inner bottom portion connected with the second end of the inner circumferential sidewall for closing the second end of the inner circumferential sidewall. The outer circumferential sidewall, the inner circumferential sidewall, and the inner bottom portion are integrally formed. The pillow is made of plastic material.

In accordance with the second aspect of the invention, a pillow for holding a bearing comprises a base portion; an outer circumferential sidewall vertically provided on said base portion and having a radially inner side; and an inner circumferential sidewall for holding said bearing, the inner circumferential sidewall having a first end connected with the radially inner side of said outer circumferential sidewall and a second end opposite to said first end, and said outer circumferential sidewall and said inner circumferential sidewall being spaced apart except at said first end.

The outer circumferential sidewall and the inner circumferential sidewall are integrally formed.

The pillow further comprises an inner bottom portion connected with the second end of the inner circumferential sidewall for closing the second end of the inner circumferential sidewall. The outer circumferential sidewall, the inner circumferential sidewall, and the inner bottom portion are integrally formed. The pillow is made of plastic material.

BRIEF DESCRIPTION OF THE DRAWINGS

The above and other objects and the features and effects of the present invention can be best understood by referring to the following detailed description of the preferred embodiments and the accompanying drawings, wherein.

DETAILED DESCRIPTION OF THE PREFERRED EMBODIMENT

Figure 2:
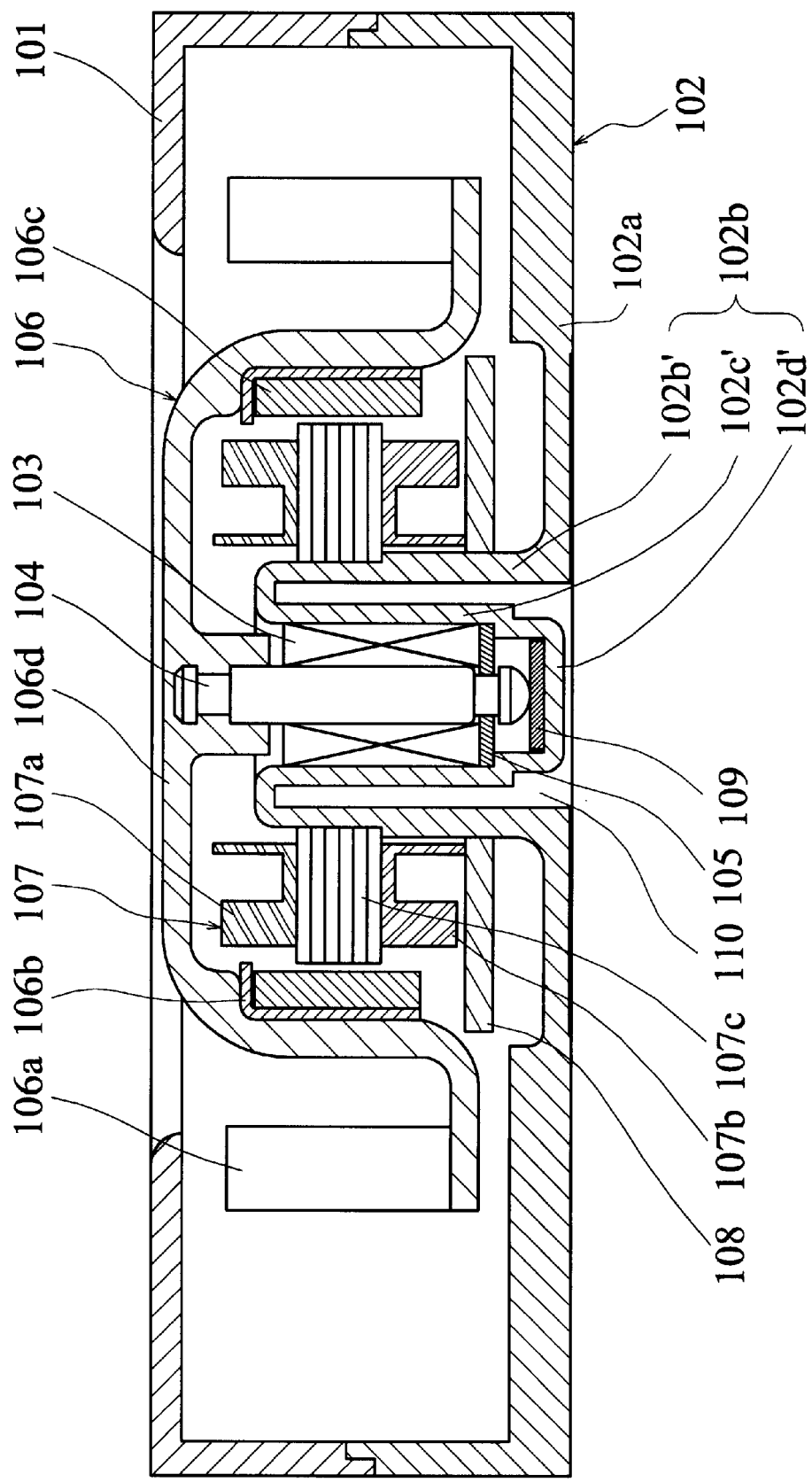
FIG. 2 is a schematic sectional view of a fan motor structure in accordance with a preferred embodiment of the invention.

Referring now to FIG. 2, a fan motor in accordance with a preferred embodiment of the invention comprises: an upper casing 101; a lower casing 102 having a base portion 102a and a pillow portion 102b (consisting of an outer circumferential sidewall 102b', an inner circumferential sidewall 102c', and an inner bottom portion 102d'); a bearing 103 received in the pillow portion 102b; a rotation axis 104 supported by the bearing 103; a C-ring 105 snap engaged with the rotational axis 104 for securing the bearing 103 at an axial location; an impeller 106; a coil unit 107; and a printed circuit board 108. The impeller 106 consists of a plurality of blades 106a, a yoke 106b, a ring-shaped magnet 106c, and a hub portion 106d. The coil unit 107 consists of an upper cover 107a, a lower cover 107b, and a stator core 107c.

For convenience of explanation, the pillow portion 102b is divided into an outer circumferential sidewall 102b' in contact with the coil unit 107, an inner circumferential sidewall 102c' in contact with the bearing 103, and an inner bottom portion 102d' at the lower end of the inner circumferential sidewall 102c'. The upper end (the first end) of the inner circumferential sidewall 102c' is connected with the upper end of the outer circumferential sidewall 102b' and the lower end (the second end) of the inner circumferential sidewall 102c' is connected with the circumference of the inner bottom portion 102d'.

Figure 1:
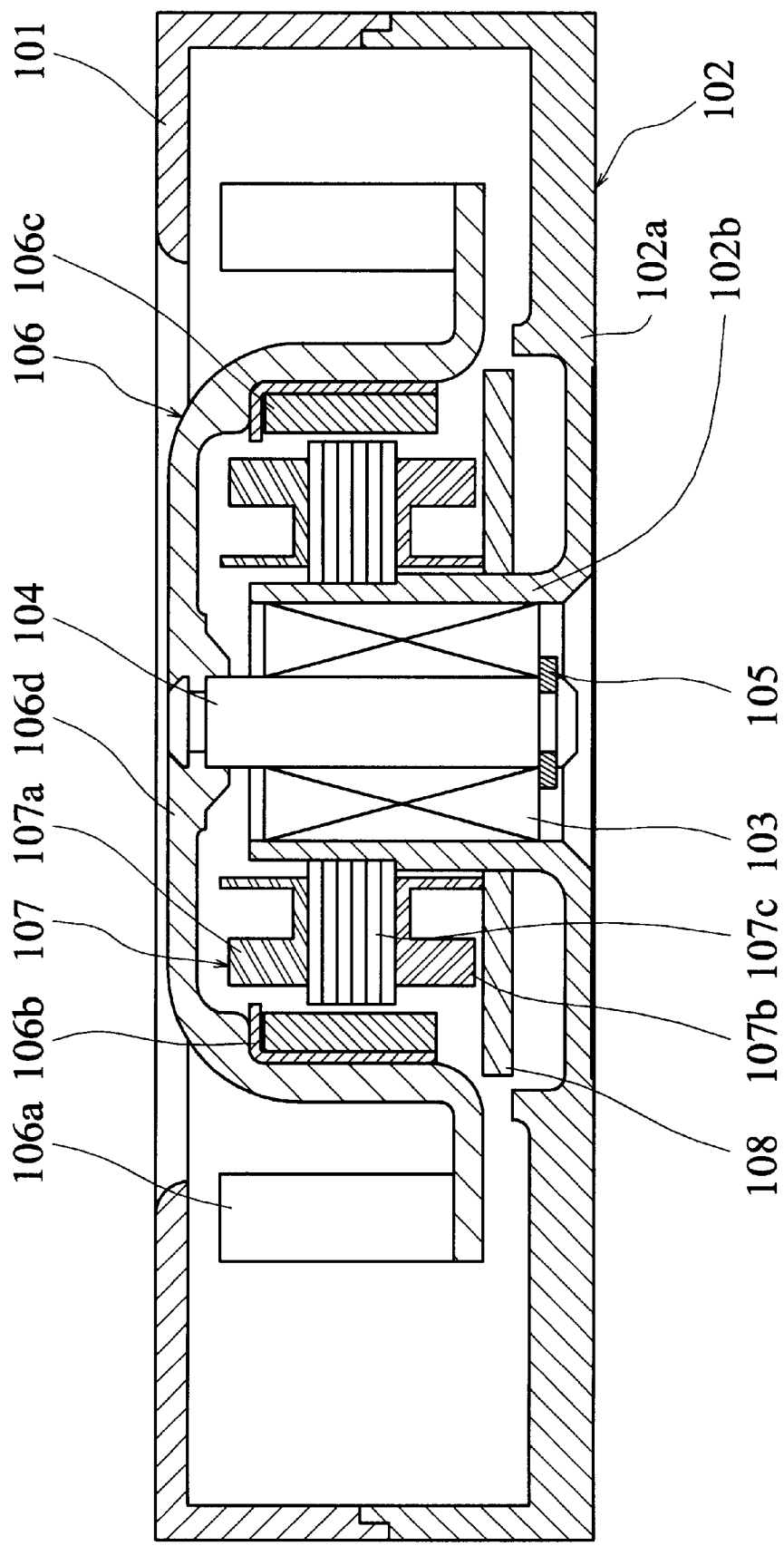
FIG. 1 is a schematic sectional view of a conventional fan motor structure.

By comparing FIGS. 2 and 1, it can be known that the preferred embodiment is characterized in that there is a space 110 formed between the outer circumferential sidewall 102b' and the inner circumferential sidewall 102c'.

The space 110 is filled with air. Due to that the heat conductivity of air is smaller than that of any solid material, the space 110 can insulate the heat generated in the coil unit 107 from being transmitted to the bearing 103. Thereby, the life of the bearing 103 can be prolonged.

In another aspect, the base portion 102a, the outer circumferential sidewall 102b', the inner circumferential sidewall 102c', and the inner bottom portion 102d' can be integrally formed from plastic material. Due to that plastic material has elastic and vibration absorbing features and the free degrees provided by the joint between the outer circumferential sidewall 102b' and the inner circumferential sidewall 102c', the pillow portion 102b allows the inner circumferential sidewall 102c' to vibrate in the horizontal direction in FIG. 2 and can absorb the vibration. Thereby, the vibration cannot transmit to the outer circumferential sidewall 102b' and the coil unit 107.

Furthermore, the inner bottom portion 102d' encloses the bottom end of the inner circumferential sidewall 102c' so that the lubricant leaking from the bearing 103 can be held by the inner bottom portion 102d'. In addition, a wear liner 109 is provided on the inner bottom portion 102d' to aid the C-ring 105 to rotatably support the rotation axis 104.

Figure 3:
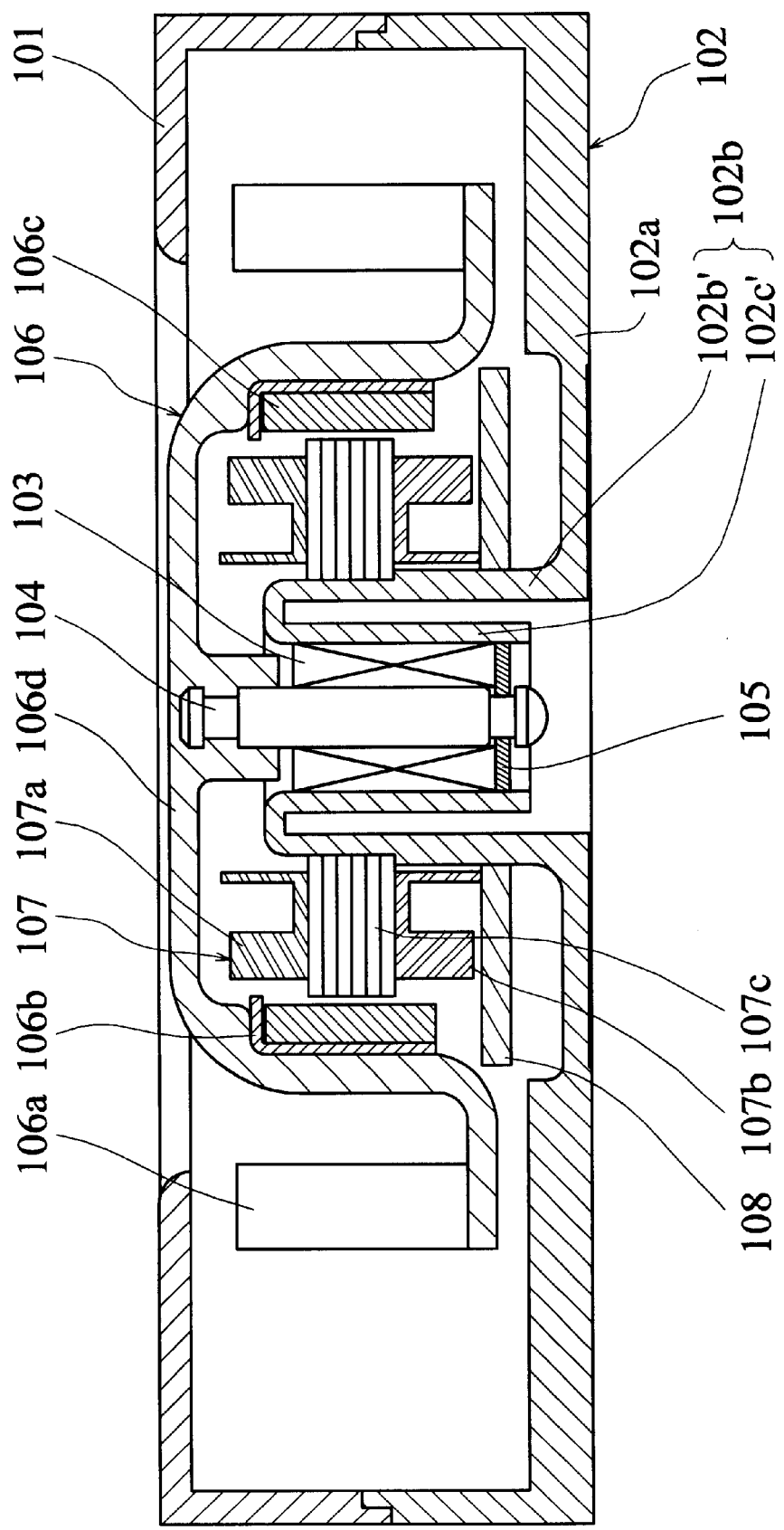
FIG. 3 is a schematic sectional view of a fan motor structure in accordance with another preferred embodiment of the invention.

Although a preferred embodiment of the invention has been illustrated and described, it will be obvious to those skilled in the art that various modifications may be made without departing from the scope and spirit of the invention defined by the appended claims. For example, in the fan motor shown in FIG. 3 (in which elements similar to those shown in FIG. 2 are designated by the same numerals as in FIG. 2), the inner bottom portion 102d' as shown in FIG. 2 is omitted so that the lower end of the inner circumferential sidewall 102c' is not closed. This design, similar to the above-mentioned embodiment, can provide vibration absorbing and heat insulating effects. Additionally, the outer circumferential sidewall 102b', the inner circumferential sidewall 102c', the inner bottom portion 102d', and the base portion 102a can integrally form a pillow having the feature of a base.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. A pillow for holding a bearing, comprising:
   an outer circumferential sidewall having a radially inner side;
   an inner circumferential sidewall configured to hold said bearing;
   the inner circumferential sidewall comprising first and second ends, a radially inner side contacting said bearing and a radially outer side facing the radially inner side of said outer circumferential side wall;
   the first end of said inner circumferential wall connected with said outer circumferential sidewall; and
   said outer circumferential sidewall and said inner circumferential sidewall being spaced apart to form an air space therebetween except at the first end of said inner circumferential side wall.

2. The pillow according to claim 1, wherein said outer circumferential sidewall and said inner circumferential sidewall are integrally formed.

3. The pillow according to claim 1, further comprising an inner bottom portion connected with said second end of said inner circumferential sidewall for closing said second end of said inner circumferential sidewall.

4. The pillow according to claim 3, wherein said outer circumferential sidewall, said inner circumferential sidewall, and said inner bottom portion are integrally formed.

5. The pillow according to claim 3, the pillow being made of plastic material.

6. A pillow for holding a bearing, comprising:
   a base portion;
   an outer circumferential sidewall vertically provided on said base portion and having a radially inner side; and
   an inner circumferential sidewall configured to hold said bearing;
   the inner circumferential sidewall comprising first and second ends, a radially inner side contacting said bearing and a radially outer side facing the radially inner side of said outer circumferential sidewall;
   the first end of said inner circumferential sidewall connected with said outer circumferential sidewall; and
   said outer circumferential sidewall; and said inner circumferential sidewall being spaced apart to form an air space therebetween except at the first end of said inner circumferential sidewall.

7. The pillow according to claim 6, wherein said outer circumferential sidewall and said inner circumferential sidewall are integrally formed.

8. The pillow according to claim 6, further comprising an inner bottom portion connected with said second end of said inner circumferential sidewall for closing said second end of said inner circumferential sidewall.

9. The pillow according to claim 8, wherein said outer circumferential sidewall, said inner circumferential sidewall, and said inner bottom portion are integrally formed.

10. The pillow according to claim 8, the pillow being made of plastic material.

* * * * *